United States Patent [19]

Schermutzki

[11] Patent Number: 4,743,187
[45] Date of Patent: May 10, 1988

[54] APPARATUS FOR THE PRODUCTION OF FIBER WEB REINFORCED PLASTIC LAMINATES

[75] Inventor: Konrad Schermutzki, Remseck, Fed. Rep. of Germany

[73] Assignee: Santrade Ltd., Lucerne, Switzerland

[21] Appl. No.: 922,999

[22] Filed: Oct. 24, 1986

[30] Foreign Application Priority Data

Nov. 14, 1985 [DE] Fed. Rep. of Germany ....... 3540389

[51] Int. Cl.⁴ .................... B29C 43/22; B29C 43/48
[52] U.S. Cl. .................................. 425/73; 100/152; 156/583.5; 425/83.1; 425/91; 425/92; 425/102; 425/371; 425/456
[58] Field of Search .............. 425/90, 91, 92, 101, 425/102, 371, 406, 447, 456, 73, 80.1, 83.1; 264/70, 122, 125, 112, 71; 118/202, 257; 156/583.5, 62.2; 427/195, 428; 100/152

[56] References Cited

U.S. PATENT DOCUMENTS

| | | |
|---|---|---|
| 2,351,495 | 6/1944 | Dodd .................... 246/219 |
| 3,012,901 | 12/1961 | Reese .................... 264/112 |
| 3,313,010 | 4/1967 | Betz ..................... 425/371 |
| 3,461,016 | 8/1969 | Irving et al. ............ 156/62.2 |
| 3,577,290 | 5/1971 | Baskerville et al. ....... 425/371 |
| 3,773,876 | 11/1973 | Rath et al. .............. 264/112 |
| 3,836,354 | 9/1974 | Wienert .................. 264/70 |
| 3,974,024 | 8/1976 | Yano et al. .............. 264/70 |
| 4,055,688 | 10/1977 | Caratsch ................. 427/197 |
| 4,096,016 | 6/1978 | Pohl ..................... 427/197 |
| 4,139,613 | 2/1979 | Hefle .................... 427/197 |
| 4,141,929 | 2/1979 | Stoops et al. ............ 264/113 |
| 4,159,355 | 6/1979 | Kaufman .................. 118/257 |
| 4,264,644 | 4/1981 | Schaeti .................. 118/202 |
| 4,371,568 | 2/1983 | Von Tell ................. 427/195 |
| 4,432,717 | 2/1984 | Viemon ................... 264/70 |

FOREIGN PATENT DOCUMENTS

| | | |
|---|---|---|
| 667438 | 7/1963 | Canada ................... 156/583.5 |
| 2312816 | 2/1975 | Fed. Rep. of Germany . |
| 2922152 | 12/1980 | Fed. Rep. of Germany . |
| 2948235 | 6/1985 | Fed. Rep. of Germany . |
| 413345 | 12/1966 | Switzerland . |
| 4304 | of 1906 | United Kingdom .......... 118/257 |
| 493541 | 1/1937 | United Kingdom . |
| 531762 | 10/1976 | U.S.S.R. . |
| 1075955 | 2/1984 | U.S.S.R. . |

*Primary Examiner*—Willard E. Hoag
*Attorney, Agent, or Firm*—Burns, Doane, Swecker & Mathis

[57] ABSTRACT

In the production of a glass mat-reinforced thermoplastic, a mat and resin are pressed and heated in a compression zone of a dual belt press. The resin is metered onto the upper flights of the two belts of the press in powder form, and is heated at least to the extent that it adheres as a layer to those flights so as to be conveyed without difficulty into the compression zone. The glass fiber mat itself can be preimpregnated with resin prior to entering the press.

16 Claims, 4 Drawing Sheets

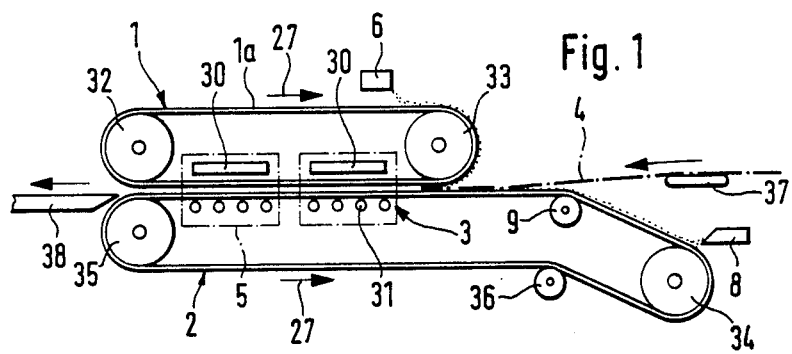
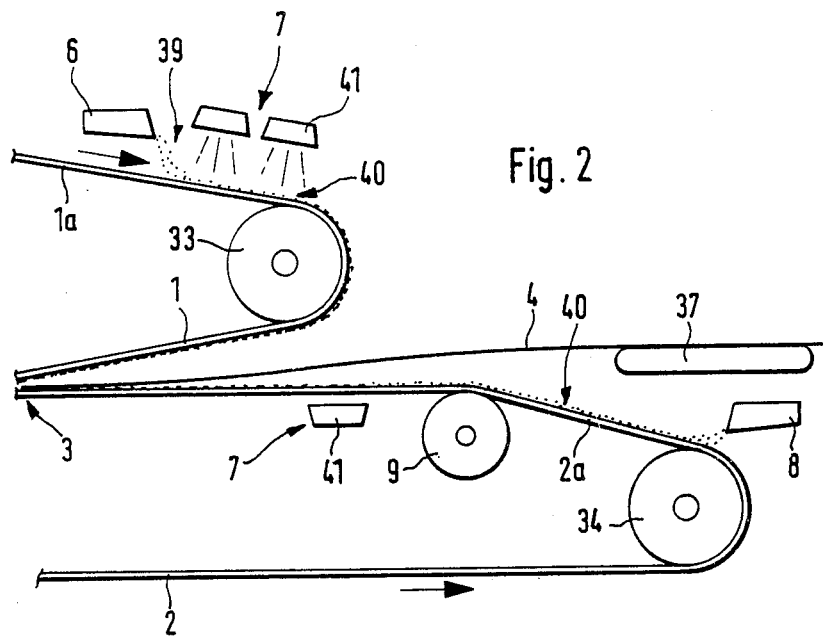

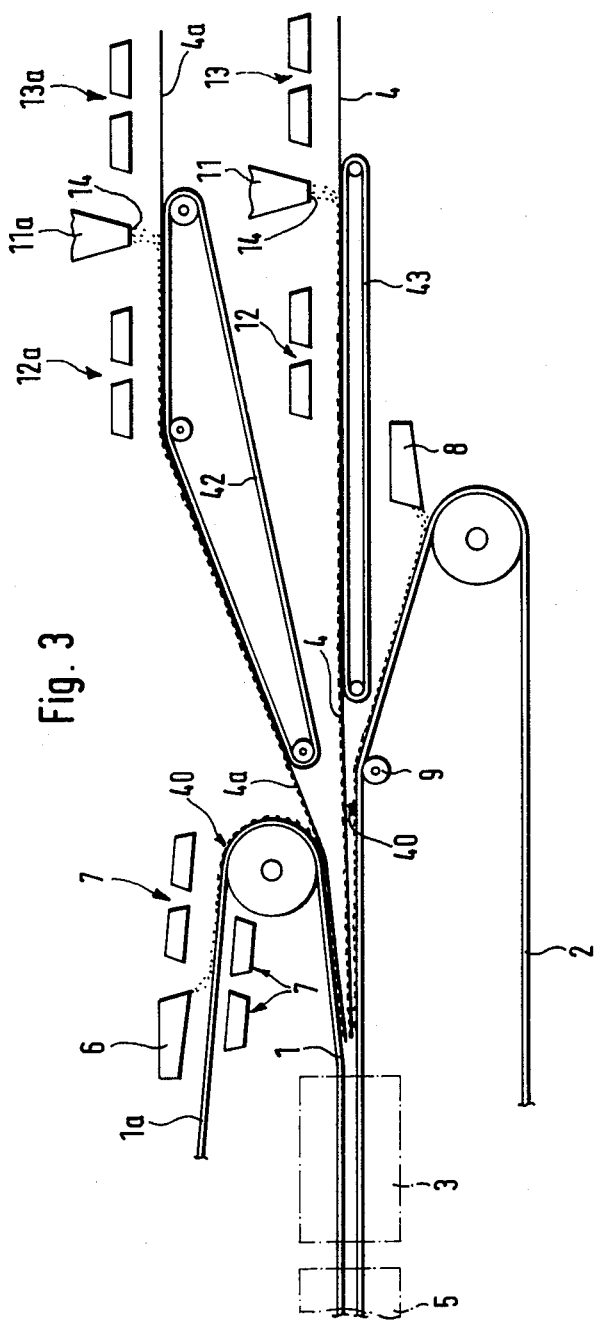

APPARATUS FOR THE PRODUCTION OF FIBER WEB REINFORCED PLASTIC LAMINATES

BACKGROUND AND OBJECTS OF THE INVENTION

The invention concerns an apparatus for the production of glass mat reinforced thermoplastic materials.

Apparatuses of this type are known from German Pat. No. OS-23 12 816. In the known configurations two reinforcing fibers mats are introduced separately in the form of webs into a gap between two feed rolls, and an extruded strand of a thermoplastic resin is sandwiched between the two fiber mats. This sandwich enters a compression zone, wherein the resin penetrates the fiber mats under the effect of (a) heating the fiber mats as well as the rolls transporting them in the compression zone, and (b) the pressure in the compression zone generated by two revolving endless belts. Then, the sandwich is passed through a cooling zone to form the desired end product. The feeding of the extruded material is not easily controlled and much care must be taken in the known process and apparatus to ensure that the resin introduced between the glass fiber mats actually penetrates the mats, so that the finished product will have a smooth outer surface.

It is also known to use for the production of a glass fiber reinforced thermoplastic resin plate a so-called twin belt press, for example as disclosed by German Pat. No. 29 48 235, into the press gap of which are introduced two glass fiber mats with an extruded resin strand disposed between the mats. On the outside of each mat is disposed a film of a thermoplastic resin. This apparatus has, however, the disadvantage that if the films comprise prefabricated foil sheets, additional heat must be applied in the compression zone. Also, the thickness of the prefabricated film does not make possible any adaptation or conversion of the outside surfaces of the plates to another grade.

It is an object of the present invention to make possible the accurately metered feeding of thermoplastic resin, whereby the desired impregnation of the glass fiber mats and the satisfactory formation of the outside surfaces of the finished product are assured.

SUMMARY OF PREFERRED EMBODIMENTS OF THE INVENTION

This object is attained wherein the upper flight of at least one of the endless belts is provided, upstream of the compression zone, with (a) a feeding device for the resin in powder form and (b) a heating device whereby the powdered resin mixture is heated at least to the extent that it adheres as a layer to the belt surface and is transported with the belt into the compression zone. This enables an accurate metering to occur whereby the penetration and impregnation of the glass fiber webs is effected from the outside, so that the formation of a satisfactory surface is assured. Excessive or inadequate feedings can thus be avoided in a simple manner.

It is advantageous to provide, in the case of a twin belt press, a powder feeding device and a heating installation for the upper flights of the upper and lower belts, so that the glass fiber web is sandwiched between two soft resin layers capable of adhering to both belts, and being easily released from the belts following passage through a cooling zone.

The heating installations may comprise thermal radiators or heating drums in contact with the endless belts (the belts preferably being made of steel). The thermal radiators are assigned appropriately to the approximately horizontal upper flight of the upper belt, and the heat drums are assigned to the upper flight of the lower belt so that the powder sprinkled onto the upper belt is heated from the outside and the powder on the lower belt is heated from the inside through the steel belt. Obviously, thermal radiators may be also assigned additionally or exclusively to both the upper and lower belts and heat drums may be provided for the upper belt, if this mode of softening the powder should prove to be more convenient or simple.

It is particularly advantageous in the case of the novel apparatus to provide for the glass web a feeder device to sprinkle the web with resin powder, the feeder device being followed by a heating installation for the softening of the applied powder. It is possible in this manner to preimpregnate the glass fiber web to a certain extent, so that a particularly intimate bond is obtained between the glass fiber web and the resin layers. The heating installation for the glass fiber web may be arranged after the location wherein the powder is applied. It is, however, also advantageous to heat the powder by preheating the glass fiber mats themselves, so that the glass fiber mat is able to serve as a heat carrier for the powder and which melts upon contact. It is further possible and appropriate in this configuration to insert, downstream of the powder sprinkling device, a scattering device for the application of cut glass fibers, which could for example drop from a cutting device supplied with glass rovings. The cut glass fibers are distributed over the softened powder layer and are conveyed, together with the glass fiber web, into the compression gap of the laminating zone formed by the twin belt press. In this manner, other components may be introduced in addition to the glass fiber mat to reinforce or affect the resin laminate.

It may further be advantageous and convenient in the processing of the glass fiber web to use the gap between two contact pressure rolls as the sprinkling device for the resin powder, with the glass web being drawn through the gap approximately in the vertical direction and the resin powder to be distributed by means of metering devices across the width of the web. The resin powder thus penetrates both sides of the glass fiber web, which may be preheated. The resin powder is then pressed laterally against the glass fiber web by the heated contact pressure rolls, so that it adheres thereto. The glass fiber web prepared in this manner is then conveyed approximately in the vertical direction to a second guide roll pair. A heating installation is provided in the space between the two pairs of rolls, so that the resin particles adhering on both sides of the glass fiber web are completely melted and are shaped by the second heated pair or rolls into a compact, void-free laminate, wherein resin flows around the glass fibers. The heating installation may comprise infrared radiators, capable of effecting the rapid melting of the resin powder in an inert gas environment, whereupon the resin may be pressed by the second pair of rolls in a flowable state onto the glass fiber web. The glass fiber web processed in this manner enters a particularly intimate bond with the two softened powder layers on the upper and lower belts of a twin belt press. The final product obtained is uniformly impregnated by the resin and has smooth outer surfaces.

BRIEF DESCRIPTION OF THE DRAWING

The invention is shown in the drawing by means of preferred embodiments and is explained below in more detail. In the drawing:

FIG. 1 is a schematic side elevational view of a twin belt press equipped according to the invention for the production of glass mat reinforced plastic plates;

FIG. 2 is an enlarged view of the inlet zone of the twin belt press of FIG. 1;

FIG. 3 is a view similar to FIG. 1 of a modified form of the twin belt press of FIG. 1, wherein the glass fiber web entering the twin belt press also carries resin;

DETAILED DESCRIPTION OF PREFERRED EMBODIMENTS OF THE INVENTION

Figure 4:
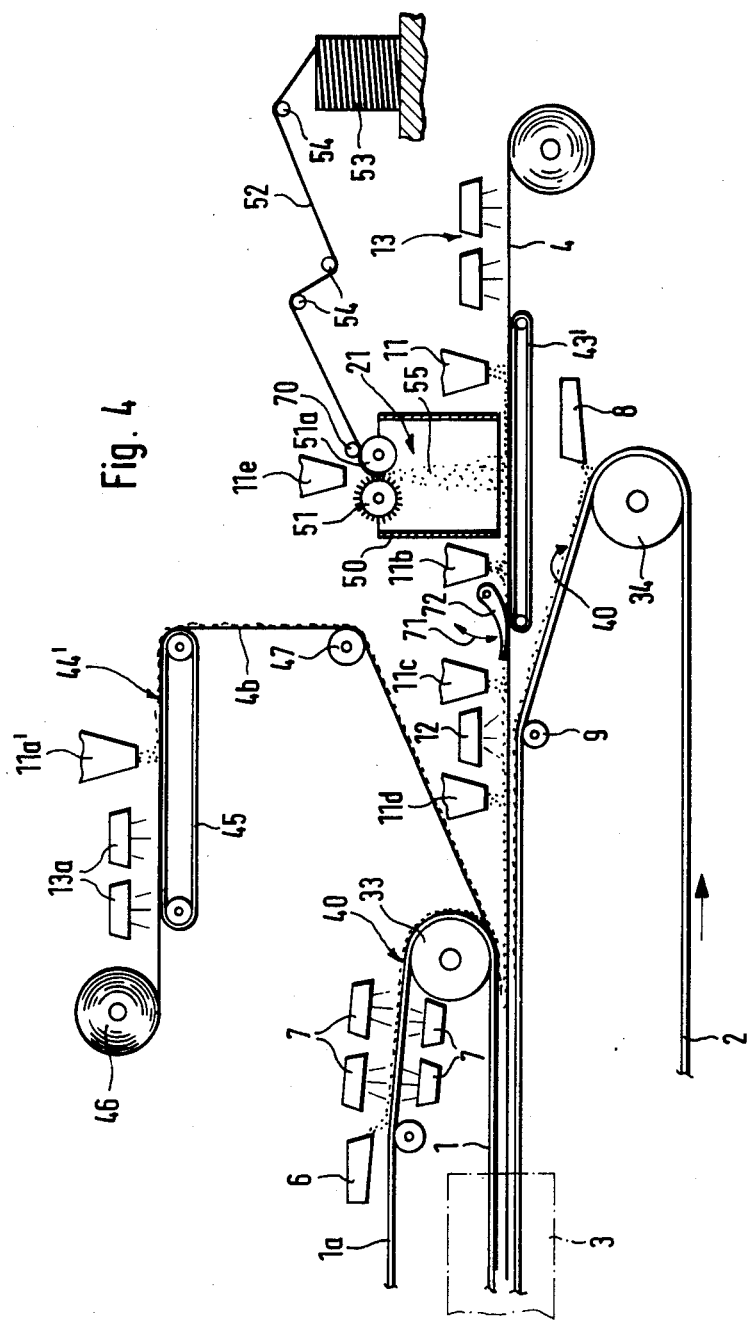
FIG. 4 depicts an installation similar to FIG. 3, wherein two glass fiber mats are entering the compression gap and cut glass fibers are added additionally.

FIGS. 1 and 2 show a twin belt press comprising an endlessly revolving upper belt 1 and an endlessly revolving lower belt 2, the belts 1,2 forming a compression zone 3 wherein the horizontal upper flight of the lower belt 2 and the horizontal lower flight of the upper belt 1 are pressed toward each other by means of pressure bodies 30 and roller conveyors 31 in a conventional manner. This pressure between the opposing flights is also maintained in a cooling zone 5 which follows the compression zone. This configuration of the twin belt press is conventional. In the preferred embodiment, the temperature of the pressure bodies 30 may be controlled in a known manner, for example, by means of a heated oil flowing through the bodies. The upper belt 1 travels around two support rolls 32, 33 at least one of which is driven. The lower belt 2 is driven by one of a pair of support rolls 34, 35. Additional support rolls 9, 36 are provided for the lower belt 2, each of which may be heated for reasons to be discussed.

The upper belt 1 and the lower belt 2 revolve in opposite directions 27 so that the opposing flights in the zone 3 travel in the same direction. A web in the form of a glass fiber mat 4 enters the compression gap defined by the opposing flights. The mat 4 may be unwound from a bale and guided over a feeder table 37, until it reaches the compression and is seized by the opposing flights and is drawn through the press. The mat is shaped in the press using thermoplastic resins, then conveyed over the discharge table 38 and subsequently and optionally cut to the desired size. The press thus serves to produce glass fiber mat-reinforced plastic plates.

In order to obtain an intimate bond of the thermoplastic resin with the glass fiber mat 4 on the one hand, and satisfactory and smooth surfaces on the other, the thermoplastic resin mixture in powder form is sprinkled onto the approximately horizontal forward part of the upper flight 1a of the upper belt 1 by means of a feeder device 6. The powder is sprinkled to form a finely metered layer of a thickness required for uniform penetration into the glass fiber mat 4 and the formation of a smooth surface. This powder layer 40 is heated on its way to the reversing zone around the support roll 33 by a heating installation 7 in the form of infrared radiators 41 above the belt and/or heating devices under the belt. Just enough heating occurs so that the powder begins to melt and adheres to the surface of the upper flight 1a of the upper belt 1. The softened resin layer then travels with the belt 1 around the support roll 33 and arrives in the compression gap in front of the pressing zone 3, where it comes into contact with the glass fiber mat and is able to penetrate the glass fiber mat in the compression zone 3 under the effect of temperature and pressure.

A layer 40 of the powder is also applied to an infeed portion of the upper flight 2a of the lower belt 2 in front of the compression zone 3 by means of a resin feeder device 8. That layer is heated during the passage of the belt flight 2a over the heating roll 9 and past the heat radiators 41 until it melts and then arrives in the compression zone. In this zone the resin impacts the glass fiber mat 4 from below.

Accordingly, the mat is exposed to a soft resin layer capable of penetrating the fiber glass mat on both sides. The novel twin belt press has the advantage that the resin may be applied in a dry powder form in a finely metered manner onto the belts, without the powdered resin being able to slide-off in an uncontrolled manner from the upper flight 1a of the upper belt 1.

FIG. 3 shows a modification of the apparatus for the production of glass fiber reinforced thermoplastic material, wherein a second glass fiber mat 4a is introduced into the compression zone 3 and the dry thermoplastic resin powder is applied not only to the two belts 1 and 2, but also to the glass mats 4 and 4a.

For this purpose, the two glass mats 4 and 4a, which may be unwound from a bale, are guided in an approximately horizontal manner by means of feeder belts 42, 43 and enter the compression zone without appreciable deflection. Heating radiators 13, 13a in the form of infrared radiators are arranged above the belts 42 and 43, the heaters serving to heat the incoming glass fiber mats 4 and 4a upstream of the belt conveyors 42 and 43. A feeder 11, 11a is provided above the belt conveyors 42 and 43 to sprinkle the thermoplastic resin in dry powder form onto the glass fiber mats 4 and 4a. The powder drops from a powder outlet 14 of a sprinkling device (not shown in detail) onto the top side of the respective glass fiber mat. This resin powder will be heated upon contacting the surface of the glass fiber mats, as the glass fiber mats have been preheated. Preheating may be carried out to the extent that the powder becomes softened upon reaching the mat, whereupon the resin penetrates the glass fiber mat. This impregnating process may be reinforced by additional heating radiators 12, 12a position above the belt conveyors 42, 43, so that both glass fiber mats 4 and 4a may be conveyed to the twin belt press in a preimpregnated form and with a certain resin layer 44 on their top sides. Thermal insulation may be provided on the path of the resin webs 4, 4a to the compression zone 3, if necessary. It is further possible to provide additional sources of heat. In the compression zone 3 the two glass mats, processed in the manner described above, come together on the upper belt 1 and the lower belt 2, respectively. The mats are suitably laminated in this zone and may be solidified in the cooling zone 5, prior to leaving the press.

FIG. 4 shows a variant of the installation of FIG. 3. Here, in addition to the glass fiber mat 4 transported by means of a conveyor 43' to the compression zone 3, an additional glass fiber mat 4b is supplied, which, however, is reversed by approximately 180° from its direction of unwinding from a bale 46. The glass fiber mat 4b is initially heated by infrared radiators 13a and then provided with dry thermoplastic resin powder. The powder particles 44' adhere to the surface of the strands of the glass fiber mat because of the preheating of the glass fiber mat 4b. Additional heat radiators may be placed in the area of the conveyor 45, if the resin does not penetrate into the glass fiber mat in the manner desired. The glass fiber mat 4b is then deflected at the end of the conveyor 45 downwardly in an approximately vertical direction and transported around a support roll 47 at an obtuse angle to the support roll 33 of the upper belt 1. The glass fiber mat 4b is thus impregnated to some degree upon its entry into the compression zone 3 and the compression gap preceding it and carries a resin layer 44' at its bottom side, which later will face the top side of the glass fiber mat 4 conveyed below it. This results in a symmetrical structure of the laminate.

The glass fiber mat 4 is processed in a manner similar to that described relative to FIG. 3. Identical installations and parts are therefore provided with the same reference symbols. However, a device 21 for the sprinkling of cut glass fiber rovings or filaments is provided above the conveyor 43' for the glass fiber mat 4.

The device 21 comprises a cylindrical housing 50 in the upper area of which a cutter cylinder 51 and a cylindrical rubber counter roll 51a are arranged such that the blades of the cutter cylinder are in contact with the circumference of the rubber roll 51a and are cutting the incoming glass fiber rovings 52. The rovings 52 are drawn from cylindrical cross-wound bobbins 53, transported to the rubber roll 51a over reversing rods 54 and firmly pressed against the driven rubber roll 51a by a pressure roll 70. The rovings 52 are therefore transported by the rubber roll 51a in a counterclockwise direction to the cutter cylinder 51 as viewed in FIG. 4.

The cut glass fibers drop inside the housing 50 onto the surface of the softened layer of resin powder applied by the sprinkling device 11 to the surface of the glass fiber mat 4.

The housing 50 is followed by a further resin powder sprinkling device 11b, the resin powder whereof is vibrated by a subsequent vibrating device in the form of a batten plate 72 which is moved up and down around an axle in the direction of the arrows 71 to beat the fiber mat 4 in the manner of a carpet beater or grate to force resin into the glass fiber mat 4. As a result, the resin powder from the sprinkling device 11b is vibrated into the lower areas of the cut glass fiber layer 55 and distributed uniformly around the fiber strands of the mat.

Following the vibrator installation two further sprinkling devices 11c and 11d may be provided for the resin powder, together with a heating installation placed between them in the form of a controlled radiation heater 12. Thus, after their passage under the radiation heater 12, the glass fibers are again embedded in resin and then are able to form, together with the downwardly facing resin layer of the glass fiber mat 4b in the laminating zone within the press zone 3, an intermediate layer in addition to the layers defined by the glass fiber mats 4 and 4b themselves. It would also be possible to omit the introduction of the glass fiber mats 4 and 4b and instead to form the laminate only of the outer powder layers 40 and the laminate of cut glass 55 arranged in between. Alternatively, the cut glass 55 could be replaced by a web of endless strands. The application of the resin in powder form thus has advantages relative to the introduction of additional layer components.

Figure 5:
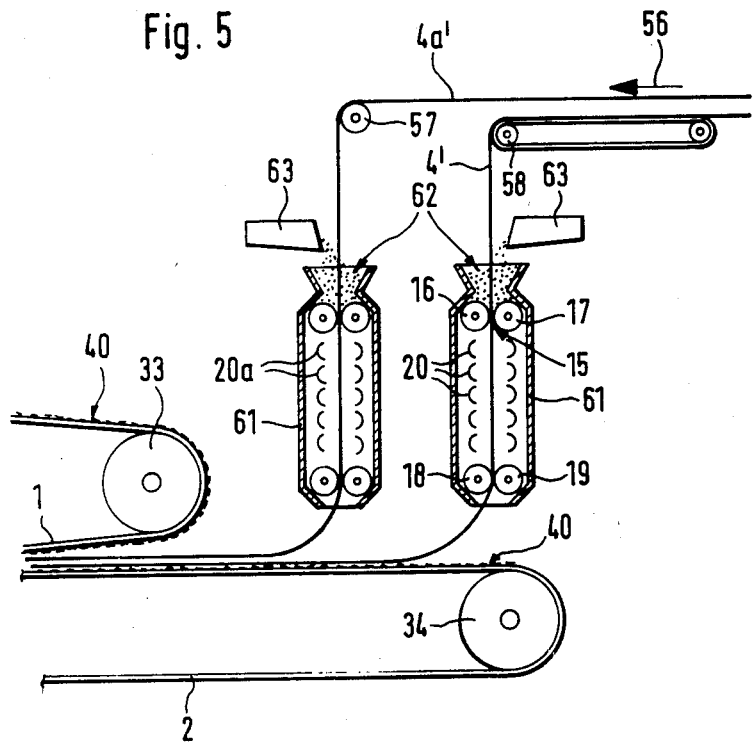
FIG. 5 is a schematic view of the inlet zone of a twin belt press, similar to the other figures, but wherein two glass fiber mats may be treated and preimpregnated in an approximately vertical feeder zone with resin powder.

In an apparatus according to FIG. 5 the upper belt 1 and the lower belt 2 are provided with resin layers 40 formed by a powder, as described in connection with the preceding figures. The sprinkling devices for the resin layer 40 are not shown, however, the glass fiber mats 4' and 4a' are introduced in the same direction (in the direction of the arrow 56) and subsequently deflected downward in an approximately vertical direction around support rolls 57 and 58. The glass fiber mats 4', 4a' enter an adjustable gap 15 between two heated rolls 16, 17, followed at a distance in the vertical direction by a further heatable pair of contact pressure rolls 18, 19. The glass fiber mats 4' and 4a' also pass through the second pair of contact pressure rolls 18, 19 and are then conveyed to the compression gap of the twin belt press. In the area between the pressure rolls 16, 17 and 18, 19, radiating heaters are provided in the form of infrared radiators 20 to soften the glass fiber mats previously coated on both sides with resin powder. The thermoplastic resin powder is introduced by means of a metering device into a nip 15 between the first pair of rolls 16, 17, where it is seized by the rolls together with the glass fiber mat 4', 4a' by the rolls. The dry powder is forced into the mat by line pressure in the gap 15 and by the pressing forces, thereby adhering to the mat fibers. Hence, the compressed resin powder is able to be liquified by the radiators 20 and penetrate into the glass fiber mat. This process is completed by the subsequent pressure rolls 18, 19, which press the softened resin layers into the glass fiber mats. Any resin powder dropping from the glass fiber mats traveling in the vertical direction and softening within the housing 61 surrounding the radiators 20 and the pairs of rolls 16, 17, 18, 19, is pressed by the rolls 18, 19 into the glass fiber mats. The oxidation of the resin is prevented by an inert gas atmosphere in the housings 61.

The glass fiber mats processed in this manner may be combined readily in the twin belt press, since they are provided with resin layers on both sides, to form with the resin layers a laminate free of air bubbles.

The feeding of the resin powder 61 into the funnel 60 is carried out in a known manner by means of powder reservoirs 63 in which the resin powder is transported uniformly, for example by vibration, to an outlet slot or the like, and is metered. The pressure rolls 16, 17 are preferably urged toward each other by springs or fluid pressure rams (not shown). The pressure rolls 16, 17 can be heated if desired.

Although the present invention has been described in connection with preferred embodiments thereof, it will be appreciated by those skilled in the art that modifications, substitutions, additions and deletions not specifically described, may be made without departing from the spirit and scope of the invention as defined in the appended claims.

What I claim is:

1. Apparatus for producing a fiber web-reinforced plastic laminate, comprising:
    a heated compression zone including upper and lower endless belts,
    first feeder means for sprinkling resin powder onto an upper flight of at least said lower belt at a location upstream of said compression zone,
    first heater means for heating said upper flight and causing said resin powder to adhere to said upper flight prior to entry thereof into said compression zone, means for advancing an impregnable fibrous reinforcing web, second feeder means for sprinkling resin powder onto an upper surface of said web upstream of said compression zone, fiber-applying means for sprinkling cut reinforcing fibers onto said upper surface of said web downstream of said second feeder means and upstream of said compression zone, vibrating means disposed downstream of said fiber-applying means and upstream of said compression zone for vibrating said web, said vibrating means comprising a vertically moving arm disposed over said upper surface and arranged to be repeatedly impacted against said powder-carrying upper surface to beat such powder into said fibrous web, and second heater means for heating said web to cause resin powder applied to said web to adhere thereto, said web-advancing means arranged to introduce said web into said compression zone such that said web, said reinforcing fibers, said resin on said upper flight, and said resin in said web are compressed together under the influence of heat to form a reinforced plastic laminate.

2. Apparatus according to claim 1, wherein said upper belt includes a lower flight having a first horizontal portion, said lower belt including an upper flight having a second horizontal portion opposing said first horizontal portion, said upper flight of said lower belt including an entrance disposed at a lower elevation than said second horizontal portion to form an infeed portion extending from said entrance to said second horizontal portion, said first feeder means arranged to sprinkle resin powder onto said infeed section.

3. Apparatus according to claim 1, wherein said first feeder means is arranged to apply the resin in the form of a meltable powder having a particle size from 0.05 mm to 2 mm.

4. Apparatus according to claim 1, including a third feeder means for applying powdered resin to an upper flight of said upper belt, and a third heater means for heating said upper belt to cause said powder to adhere thereto.

5. Apparatus according to claim 4, wherein said first heater means comprises a heated roll engaging said lower belt.

6. Apparatus according to claim 5, wherein said heated roll comprises a support roll around which said second belt changes direction.

7. Apparatus according to claim 1, wherein said first and second heater means comprises radiating heaters.

8. Apparatus according to claim 1, wherein said second feeder means sprinkles a uniform layer of powdered resin over the entire width of said fiber web.

9. Apparatus according to claim 1, wherein said second heater means is arranged upstream of said second feeder means.

10. Apparatus according to claim 1, wherein said second feeder means comprises a pair of pressure rolls for feeding said fiber web generally vertically therebetween, and means for introducing powdered resin into a region above said pressure rolls so that the resin is applied to both sides of said web upstream of said pressure rolls and is pressed into said web by said pressure rolls.

11. Apparatus according to claim 10, wherein the spacing between said pressure rolls is adjustable.

12. Apparatus according to claim 10, wherein said pressure rolls are urged toward each other.

13. Apparatus according to claim 10, wherein said pressure rolls are heated.

14. Apparatus according to claim 10 including an additional pair of pressure rolls disposed downstream of said first-named pressure rolls, said fiber web passing between said additional pair of pressure rolls.

15. Apparatus according to claim 14 including radiating heaters disposed between said first-named pair of pressure rolls and said additional pair of pressure rolls, said radiating heaters situated on opposite sides of said web.

16. Apparatus according to claim 15, wherein a zone between said pairs of pressure rolls is enclosed by a housing which contains an inert gas.

* * * * *